Oct. 13, 1964   W. NASHED ETAL   3,152,694
ARTICLE AND METHOD OF MANUFACTURE
Filed Feb. 5, 1962
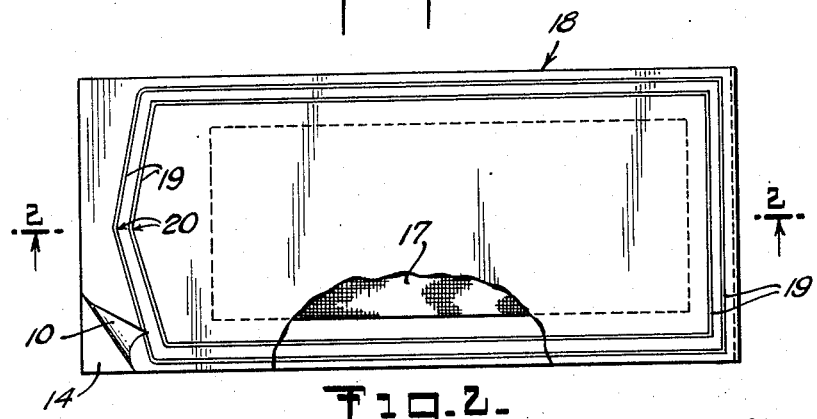
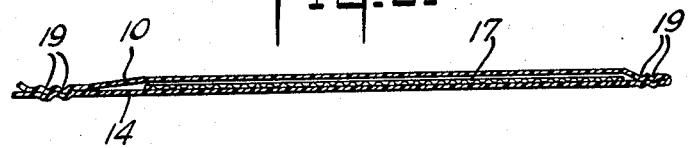
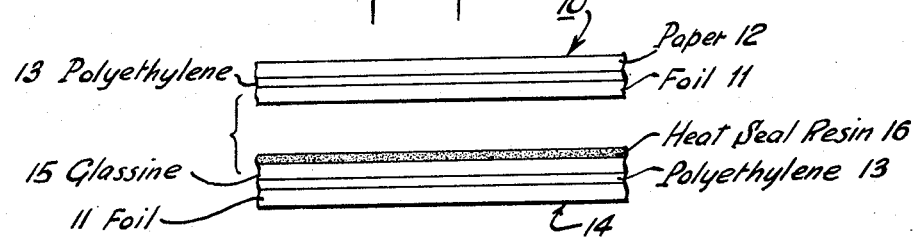
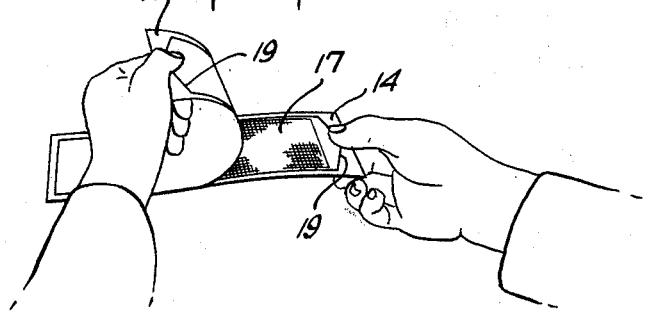
INVENTORS
WILSON NASHED
EDWARD A. PAREDES
BY
ATTORNEY 3,152,694
ARTICLE AND METHOD OF MANUFACTURE
Wilson Nashed, North Brunswick, and Edward A. Paredes, Highland Park, N.J., assignors to Johnson & Johnson, a corporation of New Jersey
Filed Feb. 5, 1962, Ser. No. 170,925
6 Claims. (Cl. 206—63.2)

This invention relates to improved metal foil packages which are adapted to be opened by pulling apart two opposed sections of the package to rupture an intermediate seal. While the packages of the invention are useful for many purposes they are particularly suitable for moist or greasy articles, especially when it is desired to heat sterilize the package and contents after sealing.

Conventional paper or plastic film packages are not suitable for moist or greasy articles such as non-adhering surgical dressings, for example, since the moisture or grease tends to permeate and strike through the packaging material. Further, it is desirable that packages for sterile articles such as non-adhering dressings be capable of being opened by stripping the walls of the package apart to expose the contents rather than by cutting or tearing the package. This is due to the fact that sterile surgical articles can be removed from a strippable package without contacting any portion of the package except the sterile interior surfaces whereas it is difficult to extract a dressing from the narrow opening provided by cutting or tearing a conventional package without contacting the non-sterile edges of the opening. It has been suggested, therefore, that moist or greasy non-adherent dressings be supplied in packages comprising metal foil barrier layers which are impermeable to moisture and grease and which have sufficient strength and stiffness to provide a package capable of being opened by stripping the layers apart without undue deformation. The use of metal foil in packages of this type, however, raised additional problems. Strippable packages made by bonding together two sheets of aluminum foil along a seal line formed by heat and pressure in an intermediate adhesive layer have not proven successful, for example, since it is difficult to produce a satisfactory strippable aluminum to aluminum seal with conventional heat seal resins especially when the sealed package containing a moist or greasy surgical article is sterilized by means of heat since sterilizing temperatures and the moisture in the package tend to weaken and rupture the aluminum-resin-aluminum seal and the resin layer has a tendency to strip off the aluminum layer during the opening of the package thus encapsulating the dressing and rendering its removal difficult.

It has been suggested that an improved seal can be obtained between two sheets of metal foil by laminating the foil with paper e.g., glassine, according to conventional procedures thus providing paper surfaces for the heat seal resin. Packages made with the metal foil-paper laminates are easily opened prior to sterilization by stripping the two sheets of laminate apart since the paper-resin-paper seal can be ruptured by tearing the fiber to fiber bond between the adjacent sheets of paper. Rupturable seals of this type adequately protect the sterility of the contents of the package even after heat sterilization. It has been found, however, that when such packages and their contents are heat sterilized the fiber to fiber bond between the adjacent paper surfaces of the two sections of the package is strengthened to an unpredictable degree requiring a high degree of control in coating and choice of proper paper finish. Consequently in those cases where proper control has not been exercised, packages which are easily strippable prior to heat sterilization tend to become so firmly bonded subsequent to sterilization that the two sheets of laminate cannot be stripped apart without tearing and deforming the walls of the package thus making it difficult to remove the enclosed surgical article without destroying its sterility.

The present invention is based upon the surprising discovery that the problems associated with the metal foil packages of the prior art can be eliminated by providing packages having a metal foil-resin-paper heat seal. This is accomplished by employing metal foil or a laminate having a metal foil facing as one section of the package and a metal foil laminate having a paper facing as the opposing section of the package. A suitable heat seal resin is coated on one of the opposed sections, preferably the paper facing, by conventional means. The article to be packaged is then placed between the metal foil and paper facings and the opposed sections of the package are sealed together by conventional heat sealing techniques along a seal line closing the package. In this way a metal foil-resin-paper heat seal is formed between the section of the package having the metal foil facing and the section composed of a metal foil laminate having a paper facing. Packages made in this way are suitable for moist or greasy articles since both sections contain a metal foil barrier layer which is completely impermeable to moisture or grease. Further, the new metal foil-resin-paper heat seal not only assures maintenance of the sterility of the contents of the sealed package but is also adapted to be readily ruptured by grasping unsealed portions of the package provided for this purpose and stripping the two sections of the package apart to expose the contents. Packages of the invention embodying the metal foil-resin-paper heat seal also have the advantage that they can be sterilized, together with their contents, after sealing without adversely affecting the strippability of the package.

The invention will now be described in greater detail in conjunction with the accompanying drawing in which:

FIG. 1 is a top plan view of a sealed package of the invention partially broken away to show the contents;

FIG. 2 is a cross sectional view of the package of FIG. 1 taken along the line 2, 2;

FIG. 3 is a schematic cross sectional view of the upper and lower sections of the package of FIG. 1 prior to forming and sealing the package; and FIG. 4 is a perspective view showing the package of FIG. 1 partially opened.

In the illustrated and preferred embodiment of the present invention a package is formed from the two laminates shown in cross section in FIG. 3. The upper laminate 10 comprises a sheet of metal foil 11 having a sheet of paper 12 laminated thereto with polyethylene 13 according to conventional procedures. The lower laminate 14 is composed of a sheet of metal foil 11 to which a sheet of glassine 15 is laminated with polyethylene 13 in a similar manner. The glassine facing 15 of the lower laminate is coated with a layer of a suitable heat seal resin 16. The article to be packaged, in this case a non-adhering surgical dressing 17 composed of a fabric of viscose filaments impregnated with a bland emulsion, for example, is inserted between the two laminates 10 and 14 before they are brought together to form the package 18.

The package 18 may be assembled in any suitable manner. For example, continuous webs of the upper laminate 10 and lower laminate 14 may be brought together between a pair of rollers after positioning the dressings 17 between the webs at suitable intervals. The packages may also be assembled by placing individual sheets of the upper laminate 10 over individual sheets of the lower laminate 14 after inserting the dressings 17. In any case the laminates 10 and 14 are brought into opposition with the metal foil facing 11 of laminate 10 adjacent to the glassine facing 15 coated with heat seal resin 16 of lower laminate 14. The package is then sealed along the seal lines 19 by means of heat and pressure according to well-known procedures, e.g. by impressing a heated die onto the upper surface of the laminate 10 and applying pressure to the sandwich composed of the two laminates supported on a suitable surface.

The package 18 formed in this way is impermeable to the moist and greasy emulsion in the non-adhering surgical dressing 17 since it contains a metal foil barrier layer 11 in each of the two sections formed by laminates 10 and 14. The package 18 and its contents 17 can be sterilized after sealing by the application of heat without adversely affecting the rupturable seal bond between the two sections 10 and 14 along the heat seal lines 19. The package may be opened as shown in FIG. 4 by grasping the free unsealed portions of the sections 10 and 14 outside of the heat seal lines 19 and stripping the two sections apart to rupture the heat seal. The apex 20 of the heat seal lines 19 facilitates the stripping operation. It may be seen from FIG. 4 that the dressing 17 may be removed with ease from the sterile area within the inner seal line 19 without contact with the non-sterile area outside of the seal line. This permits the use of excellent sterile technique not possible with those packages of the prior art from which the dressing must be withdrawn through a narrow cut or torn opening having non-sterile edges.

The paper 12 laminated to the foil 11 in the upper section 10 of the package is optional and forms no part of the invention but is employed in the preferred embodiment to provide a suitable surface for printing a label on the package. Any suitable paper or similar material may be laminated on the foil 11 for this purpose or the unlaminated foil may be imprinted directly if desired. It is preferred to employ sterilizable, non-plasticized kraft paper for layer 12. The glassine 15 laminated to the metal foil 11 in the lower section 14 of the package, on the other hand, is an essential part of the novel strippable seal of the invention. Any suitable grease proof sterilizable paper or similar material may be substituted for the glassine 15, however, including parchment and other highly hydrated papers.

Although any metal foil suitable for the purpose for which the package is intended may be used in the invention, aluminum foil is generally preferred because of its low cost, ready availability, lack of toxicity and general suitability for a wide variety of packaging purposes.

While the thickness or weight of the various materials used in making the new packages may vary within wide limits as will be obvious to those skilled in the art, experience has shown that the following limits are useful and preferred. The metal foil or the preferred aluminum foil used as moisture and grease barrier layers in the new packages may suitably have a thickness of about 0.00035 to .001 inch and a weight per ream (3000 sq. ft.) of about 14 to 43 lbs. and preferably about 27 to 33 lbs. The paper facing 15 of the lower laminate 14 which is an essential part of the novel seal of the invention may suitably have a weight of about 20 to 50 lbs. or preferably about 24 to 26 lbs. per ream (3000 sq. ft.). The preferred material for this purpose is a sterilizable, blue-green glassine having a weight of about 25 lbs. per ream. The polyethylene layer employed in the metal foil-paper laminates may suitably be coated to give a layer having a weight of about 6 to 25 lbs. per ream and preferably about 13 to 19 lbs. per ream. These figures are based on polyethylene having a density of about 0.950 and should be adjusted accordingly when polyethylene or higher or lower density is employed. The weight of the heat seal resin layers employed to form a rupturable seal between a sheet of metal foil and the paper face of a metal foil-paper laminate varies with the density and other properties of the particular resin employed. The order of magnitude of the range of useful weights of the resin layers is indicated by the weights found useful for the preferred vinyl heat seal resin Bakelite VAGH which is available from Union Carbide Plastics Company. This material is a hydroxyl modified, vinyl chloride-acetate thermoplastic copolymer resin having a specific gravity of 1.36. It has been found to be useful for the purposes of the present invention when coated to give a layer having a weight of about 2 to 8 or preferably about 4 lbs. per ream (3000 sq. ft.). Other resins may be employed in equivalent quantities depending upon their densities and other properties as will be apparent to those skilled in the art.

The invention will now be described in detail in the following specific examples.

*Example I*

A strippable package suitable for a non-adhering surgical dressing impregnated with an aqueous petroleum emulsion is made and the package and its contents sterilized by the following procedure.

An upper and a lower laminate are made according to conventional procedures from the following materials:

| | Basis weight, lbs. per ream (3000 sq. ft) |
|---|---|
| Lower laminate: | |
| Kraft paper, non-plasticized | 25 |
| Polyethylene (0.5 mil, melt index 4.0, softening point 200° F.) | 8 |
| Aluminum foil (0.35 mil) | 15 |
| Polyethylene (0.5 mil, melt index 4.0, softening point 200° F.) | 8 |
| Glassine, blue-green, sterilizable | 25 |
| Heat seal resin (Bakelite VAGH containing 5 percent by weight of dioctyl phthalate plasticizer) | 2.5–3.5 |
| Upper laminate: | |
| Aluminum foil (0.35 mil) | 15 |
| Polyethylene (0.5 mil, melt index 4.0, softening point 200° F.) | 8 |
| Glassine, blue-white | 25 |

The resin coated glassine face of the lower laminate is sealed to the aluminum foil face of the upper laminate, after inserting the non-adhering dressing therebetween, by the use of a heated die according to well-known procedures. The die is designed to form a seal line which closes the package completely to provide a hermetically sealed unit.

The heat seal resin employed in this and the following example, Bakelite VAGH, is available from the Union Carbide Plastics Company, a Division of Union Carbide Corporation. This resin is a hydroxyl modified, vinyl chloride-acetate, thermoplastic copolymer resin containing about 90 percent polyvinyl chloride and about 5.7 percent polyvinyl alcohol by weight, having a specific gravity of 1.36, a specific viscosity of 0.61 (1.0 g./methyl isobutyl ketone at 20° C.) and a viscosity (1:1 methyl isobutyl ketone:toluene at 20° C.) of 400 centipoises (20 percent resin) and 1000 centipoises (22 percent resin). Other suitable heat seal resins may be substituted.

Packages made as above and their contents are sterilized by heating to about 235° F. for a period of about 30 minutes. The resulting package is capable of maintaining the sterility of the enclosed moist, greasy non-adhering dressings indefinitely and yet is readily opened by grasping unsealed portions of the laminates as shown in FIG. 4 of the drawing and stripping the laminates apart to rupture the aluminum foil-resin-glassine seal. It should be noted that the kraft paper and the polyethylene used to laminate it to the aluminum foil in the lower laminate do not form a part of the invention. This is also true of the glassine and polyethylene in the upper laminate.

Example II

The procedure of Example I is employed to produce a strippable package for moist greasy surgical dressings from the following laminates:

|  | Basis weight in lbs. per ream (3000 sq. ft.) |
|---|---|
| Upper laminate: |  |
|   Glassine, sterilizable, opaque | 25 |
|   Polyethylene (Bakelite DGDA–7501 Nat .7) (density 0.95, melt index 6.5) | 16 |
|   Aluminum foil | 30 |
| Lower laminate: |  |
|   Heat seal resin (Bakelite VAGH) | 4 |
|   Glassine, sterilizable, blue-green | 25 |
|   Polyethylene (Bakelite DGDA–7501 Nat .7) (density 0.95, melt index 6.5) | 16 |
|   Aluminum foil | 30 |

These laminates are assembled around the dressing to be packaged with the aluminum foil face of the upper laminate in contact with the heat seal resin coating on the glassine layer of the lower laminate and sealed together by heat and pressure as in Example I. An effective seal is provided, as a rule, by employing a die temperature of about 350 to 400° F. and a die pressure of about 90 lbs./ sq. in. with a dwell time of about 1.5 seconds. The optimum sealing conditions vary with the thickness of the top laminate as would be expected; heavier glassine, polyethylene or aluminum layers requiring higher sealing temperatures, pressures and dwell time. Packages formed in this way and their contents are sterilized by heating to about 235° F. for about 30 minutes. The resulting sterile dressing packs are readily strippable by the technique shown in FIG. 4 of the drawing and thus permit excellent sterile technique in dressing a wound.

The laminates used in the new packages are prepared by well-known extrusion coating techniques in which molten polyethylene is fed through a slit into the space between a strip of aluminum foil and a strip of paper or glassine. The resulting laminate is then fed over chilled rollers to complete the operation. Polyethylene useful in the invention includes extrudable grades having a density in the approximate range of 0.918 to 0.960 which includes low, medium and high density materials. In general it is preferred to use high density polyethylene, a particularly suitable material being Bakelite DGDA– 7501 which has a density of 0.95 and a melt index of 6 to 8. This material may be coated at weights as low as about 6 lbs. per ream at a speed in excess of 375 feet per minute. Another suitable polyethylene is Bakelite DGDD–7401 which has a density of 0.95 and a melt index of 6 to 7.

The heat seal resin compositions useful in the invention include vinyl resin polymers and copolymers, vinylidene resin polymers and copolymers, and the higher melting polyethylenes which do not become tacky at about 230° F. When it is desired to produce packages capable of being sterilized by means of heat subsequent to sealing it is necessary to select resins which do not melt at sterilizing temperatures. Therefore, the preferred resins for this purpose are the high melting types, which melt below paper scorching temperature under the sealing conditions and which provide the desired adherence to metal foil and paper. More specifically, suitable resins include Bakelite VAGH, described above, VYNS.1 and VYHH.3, all available from the Union Carbide Plastics Company. The VYNS.1 resin is a vinyl chloride-acetate material containing about 88.5 to 90.5 percent of polyvinyl chloride by weight. The VYHH.3 material is a vinyl chloride-acetate resin containing about 85 to 87 percent polyvinyl chloride by weight. Another suitable resin for the formation of a rupturable seal between aluminum foil and paper is a polyvinyl formal resin, Formvar 15/95 "E" which is available from the Shawinigan Resins Corp. This material has a molecular weight of 34,000, a polyvinyl acetate content of 9.5 to 13 percent and a polyvinyl alcohol content of 5 to 6 percent by weight, and a viscosity of 40 to 60 centipoises. Any of the resins useful in the invention may be printed on the laminates in the sealing areas only rather than coated uniformly over the laminate as shown in the embodiment illustrated in the drawings.

In view of the foregoing disclosures, variations or modifications thereof will be apparent, and it is intended to include within the invention all such variations and modifications except those which do not come within the scope of the appended claims.

What is claimed is:

1. A moisture and grease proof package comprising a first section having a metal foil facing and a second section comprising a sheet of metal foil having a paper facing laminated thereon, said sections being bonded together with the metal facing of the first section facing the paper facing of the second section, said bond being formed by means of an intermediate layer of a heat seal resin having seal lines formed therein by the application of heat and pressure, said package being adapted to be opened by stripping one section from the other to rupture said seal lines.

2. A moisture and grease proof package comprising a first element having an aluminum foil surface and a second element containing an aluminum foil barrier layer and having a paper surface, said elements being bonded together with the paper surface of said second element facing the aluminum foil surface of said first element, said bond being formed by means of a layer of heat seal resin disposed between the paper surface and the aluminum foil surface and in contact with said surfaces, said layer of resin having seal lines formed therein by the application of heat and pressure, said package being adapted to be opened by stripping one element from the other to rupture said seal lines.

3. A moisture and grease proof package comprising a first element having an aluminum foil surface and a second element comprising an aluminum foil barrier layer laminated to a paper surface by means of an intermediate layer of polyethylene, said elements being bonded together with the paper surface of said second element facing the aluminum foil surface of said first element, said bond being formed by means of a layer of heat seal resin disposed between the paper surface and the aluminum foil surface and in contact with said surfaces, said layer of resin having seal lines formed therein by the application of heat and pressure, said package being adapted to be opened by stripping one element from the other to rupture said seal lines.

4. A moisture and grease proof package comprising a first element having a surface composed of a sheet of aluminum foil having a thickness of about 0.00035 to 0.001 inch and a weight of about 14 to 43 lbs./ream, and a second element containing an aluminum foil barrier layer and having a surface composed of a sheet of highly hydrated heat sterilizable paper having a weight of about 20 to 50 lbs./ream, said barrier layer being laminated to said sheet of paper by means of an intermediate layer of polyethylene, said elements being bonded together with the paper surface of said second element facing the aluminum foil surface of said first element, said bond being formed by means of a layer of heat seal resin disposed between the paper surface and the aluminum foil surface and in contact with said surfaces, said layer of resin having seal lines formed therein by the application of heat and pressure, said package being adapted to be opened by stripping one element from the other to rupture said seal lines.

5. A moisture and grease proof package comprising a first element having a surface composed of a sheet of aluminum foil having a thickness of about 0.00035 to 0.001 inch and a weight of about 14 to 43 lbs./ream, and a second element containing an aluminum foil barrier layer and having a surface composed of a sheet of highly hydrated heat sterilizable paper having a weight of about 20 to 50 lbs./ream, said barrier layer being laminated to said sheet of paper by means of an intermediate layer of polyethylene, said elements being bonded together with the paper surface of said second element facing the aluminum foil surface of said first element, said bond being formed by means of a layer of a hydroxyl modified, vinyl chloride-acetate thermoplastic copolymer heat seal resin disposed between the paper surface and the aluminum foil surface and in contact with said surfaces, said layer of resin having seal lines formed therein by the application of heat and pressure, said package being adapted to be opened by stripping one element from the other to rupture said seal lines.

6. An internally sterile moisture and grease proof package containing a sterile surgical article comprising a first element having a surface composed of a sheet of aluminum foil having a thickness of about 0.00035 to 0.001 inch and a weight of about 14 to 43 lbs./ream and a second element containing an aluminum foil barrier layer and having a surface composed of a sheet of glassine having a weight of about 24 to 26 lbs./ream, said barrier layer being laminated to said sheet of glassine by means of an intermediate layer of polyethylene, said elements being bonded together with the glassine surface of said second element facing the aluminum foil surface of said first element, said bond being formed by means of a layer of a hydroxyl modified, vinyl chloride-acetate thermoplastic copolymer heat seal resin containing about 90 percent polyvinyl chloride and about 5 to 6 percent polyvinyl alcohol by weight and having a specific gravity of about 1.3 to 1.4, said resin being disposed between the paper surface and the aluminum foil surface and in contact with said surfaces, said layer of resin having seal lines formed therein by the application of heat and pressure, said package and the surgical article therein having been sterilized by heating to about 235° F. for about 30 minutes and being adapted to be opened by stripping one element from the other to rupture said seal lines to permit removal of said surgical article from the package without loss of sterility.

References Cited in the file of this patent
UNITED STATES PATENTS

| | | |
|---|---|---|
| 2,298,421 | Salfisberg | Oct. 13, 1942 |
| 2,328,579 | Pelosi | Sept. 7, 1943 |
| 2,354,590 | Gilfillan et al. | July 25, 1944 |
| 2,400,139 | Roland | May 14, 1946 |
| 2,544,146 | Erikson | Mar. 6, 1951 |
| 2,778,760 | Hurst | Jan. 22, 1957 |
| 2,805,973 | Klasing et al. | Sept. 10, 1957 |
| 2,954,116 | Moso et al. | Sept. 27, 1960 |